(12) United States Patent
Yamaji (10) Patent No.: US 11,974,101 B2
(45) Date of Patent: Apr. 30, 2024

(54) REPRODUCTION DEVICE, REPRODUCTION SYSTEM, AND REPRODUCTION METHOD (71) Applicant: YAMAHA CORPORATION, Hamamatsu (JP)

(72) Inventor: Tetsuro Yamaji, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 9 days.

(21) Appl. No.: 17/701,784

(22) Filed: Mar. 23, 2022

(65) Prior Publication Data

US 2022/0312136 A1 Sep. 29, 2022

(30) Foreign Application Priority Data

Mar. 24, 2021 (JP) ................. 2021-049547

(51) Int. Cl.
H04R 29/00 (2006.01)
G01P 15/00 (2006.01)
G06F 3/16 (2006.01)
H04R 1/40 (2006.01)
H04R 3/12 (2006.01)

(52) U.S. Cl.
CPC ............ H04R 29/002 (2013.01); G01P 15/00 (2013.01); G06F 3/162 (2013.01); H04R 1/403 (2013.01); H04R 3/12 (2013.01)

(58) Field of Classification Search
CPC ........ H04R 29/002; H04R 1/403; H04R 3/12; G01P 15/00; G06F 3/162
See application file for complete search history.

(56) References Cited

U.S. PATENT DOCUMENTS

| 2013/0039527 | A1* | 2/2013 | Jensen | H04R 1/24 381/387 |
| 2017/0019742 | A1* | 1/2017 | Rappoport | H04H 20/18 |
| 2017/0060524 | A1* | 3/2017 | Daly | G06F 3/165 |
| 2017/0280265 | A1* | 9/2017 | Po | G06F 3/165 |
| 2020/0074977 | A1* | 3/2020 | Bernstein | G10K 11/17883 |

FOREIGN PATENT DOCUMENTS

| JP | 2012052851 A | 3/2012 |
| JP | 2017204105 A | 11/2017 |

* cited by examiner

Primary Examiner — Jason R Kurr
(74) Attorney, Agent, or Firm — ROSSI, KIMMS & McDOWELL LLP (57) ABSTRACT A reproduction device is provided with a sound-signal interface that inputs a sound signal, a signal processor that applies acoustic correction to the sound signal using a predetermined correction parameter, a sound emitter that emits a sound based on the sound signal subjected to the acoustic correction, an acceleration sensor, and a controller that configured: to update predetermined correction parameter; detect movement of the reproduction device based on the acceleration sensor; and stop the updating of the predetermined correction parameter upon the controller detecting movement of the reproduction device.

16 Claims, 12 Drawing Sheets

REPRODUCTION DEVICE, REPRODUCTION SYSTEM, AND REPRODUCTION METHOD

CROSS REFERENCE TO RELATED APPLICATIONS

This Nonprovisional application claims priority under 35 U.S.C. § 119(a) on Patent Application No. 2021-049547 filed in Japan on Mar. 24, 2021, the entire contents of which are hereby incorporated by reference.

BACKGROUND

1. Technical Field

One embodiment of the invention relates to a reproduction device, a reproduction system, and a reproduction method for reproducing sounds.

2. Background Information

Conventionally, there is provided a speaker that performs optimal acoustic correction according to an environment (e.g., position) where the speaker is installed. For instance, U.S. Patent Publication No. 2017/0280265 discloses a speaker that detects a change in an installed position of the speaker and performs recalibration when a change in the installed position becomes large to a certain degree or more, as compared with the case where calibration (parameter calibration used for acoustic correction) has been performed in the past.

Unexamined Japanese Patent Publication No. 2012-52851 discloses an electronic device having a speaker and an acceleration sensor that are built into the same housing.

Unexamined Japanese Patent Publication No. 2017-204105 discloses an electric bell that uses an acceleration sensor to detect acceleration and generates a sound.

SUMMARY

Now, it is assumed that a correction parameter, which is used for acoustic correction, is changed while a speaker is being moved. If acoustic correction is performed using the changed correction parameter, appropriate acoustic correction may be difficult to obtain.

One embodiment of the present invention aims to provide a reproduction device that performs appropriate acoustic correction even when a speaker is moved.

A reproduction device in accordance with one embodiment of the present invention is provided with a sound signal interface that inputs a sound signal, a signal processor that applies acoustic correction to the sound signal using a predetermined correction parameter, a sound emitter that emits sound based on the sound signal subjected to the acoustic correction, an acceleration sensor, and a controller configured: to update the predetermined correction parameter; detect movement of the reproduction device based on; and stop the updating of the predetermined correction parameter upon the controller detecting the movement of the reproduction device.

According to one embodiment of the present invention, appropriate acoustic correction is achieved even when a speaker is moved.

DETAILED DESCRIPTION

First Embodiment

Figure 1:
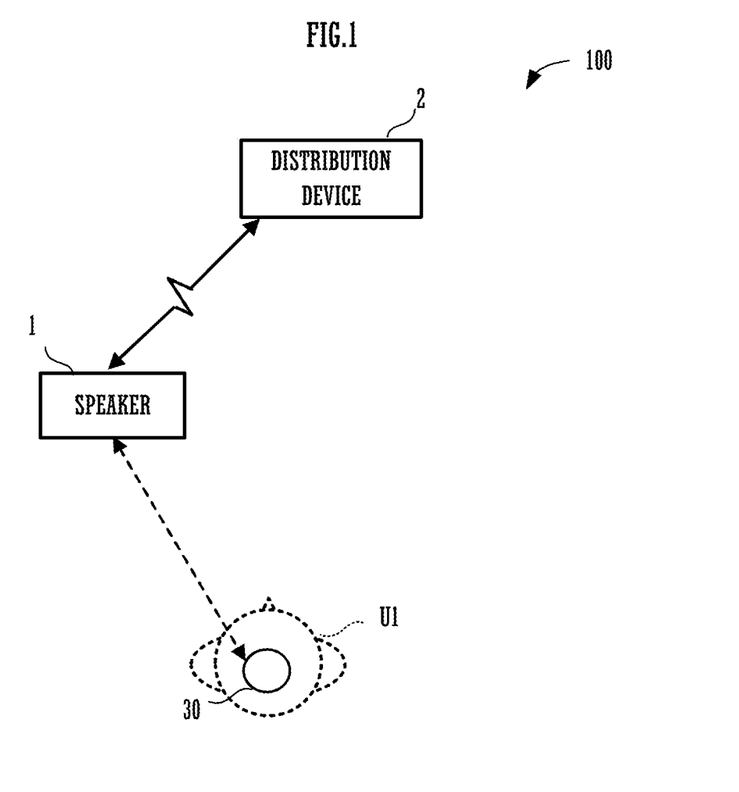
FIG. 1 is a diagram exemplarily showing a configuration of a reproduction system.
Figure 2:
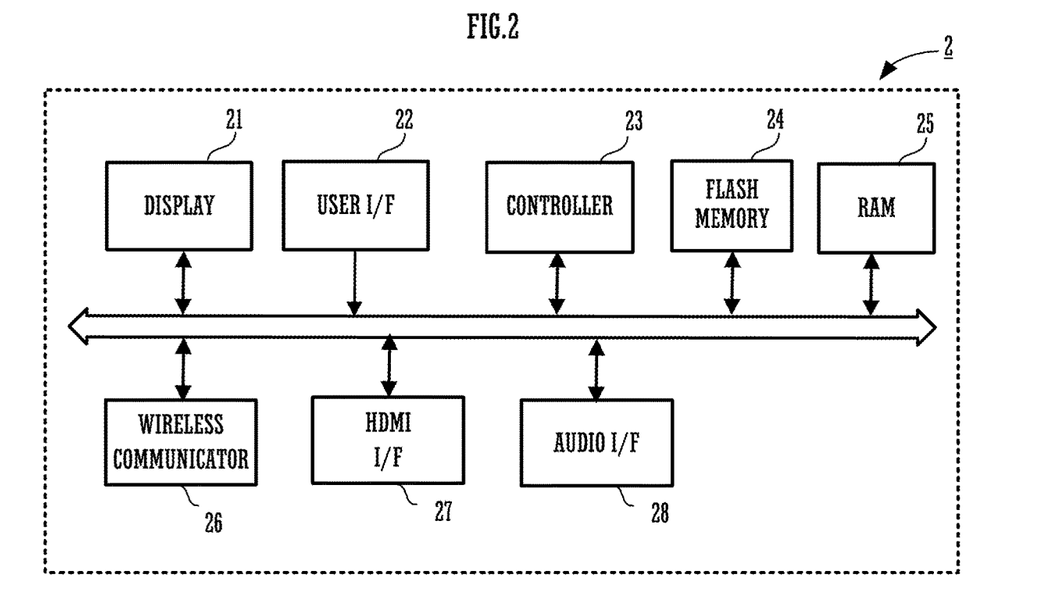
FIG. 2 is a block diagram showing a main configuration of a distribution device.
Figure 3:
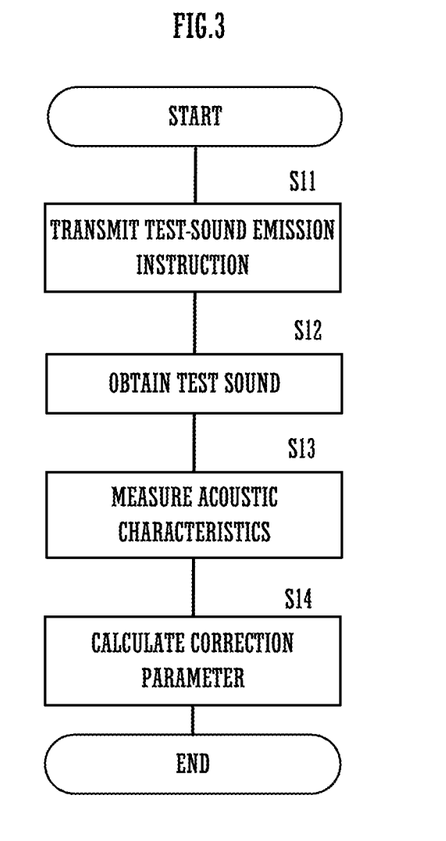
FIG. 3 is a flowchart exemplarily showing an acoustic characteristics measuring process.
Figure 4:
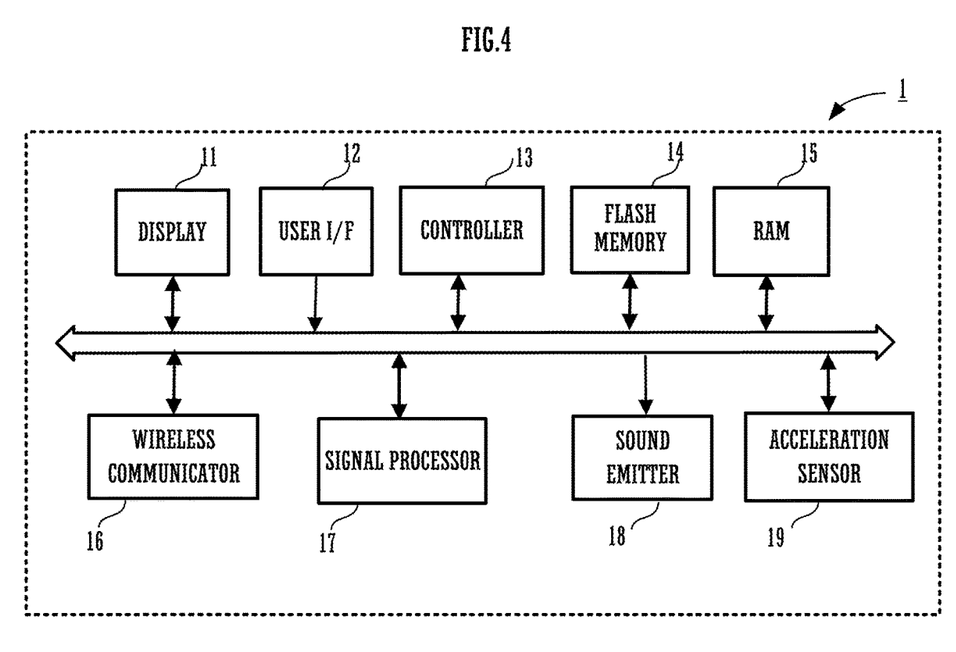
FIG. 4 is a block diagram showing a main configuration of a speaker.
Figure 5:
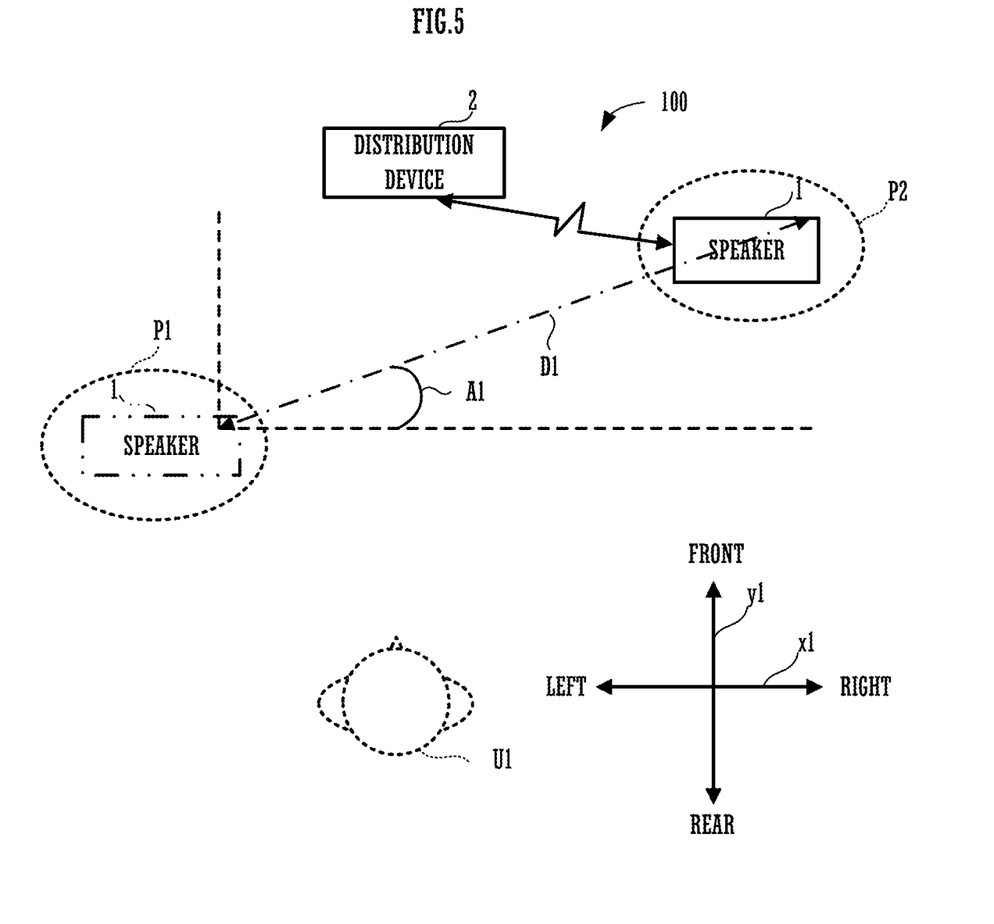
FIG. 5 is a diagram showing a configuration of the reproduction system when the speaker is moved.
Figure 6:
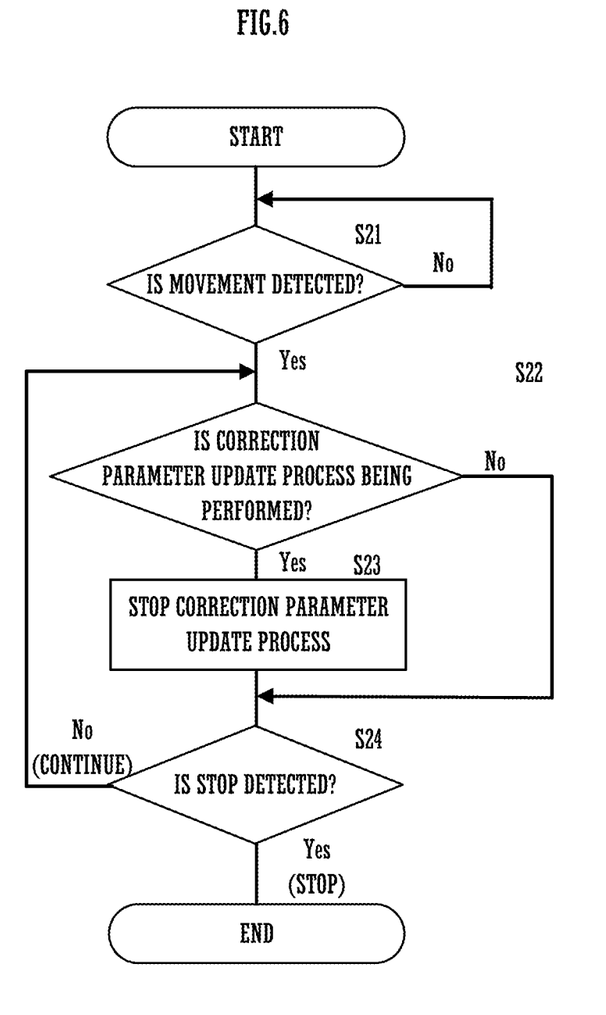
FIG. 6 is a flowchart exemplarily showing an update-process stopping process when the speaker is moved.

A reproduction system 100 will be described with reference to FIGS. 1, 2, 3, 4, 5, and 6. FIG. 1 is a diagram exemplarily showing a configuration of the reproduction system 100. FIG. 2 is a block diagram showing a main configuration of a distribution device 2. FIG. 3 is a flowchart exemplarily showing an acoustic characteristics measuring process. FIG. 4 is a block diagram showing a main configuration of a speaker 1. FIG. 5 is a diagram showing a configuration of the reproduction system 100 when the speaker 1 is moved to a position P2 from a position P1. FIG. 6 is a flowchart exemplarily showing an update-process stopping process when the speaker 1 is moved to the position P2 from the position P1.

The reproduction system 100 is provided with the speaker 1, the distribution device 2, and a microphone 30, as shown in FIG. 1. Further, a user U1 is shown in FIG. 1. The speaker 1 is an example of a reproduction device in the present disclosure.

The distribution device 2 receives content data from a server (not shown) through the Internet or the like. Further, the distribution device 2 receives content data from a television (not shown) through a cable, e.g., HDMI (registered trademark).

The distribution device 2 is connected to the speaker 1, wirelessly. The distribution device 2 transmits a sound signal related to the received content data to the speaker 1. The speaker 1 emits a sound of the content based on the sound signal received from the distribution device 2.

Note that, the distribution device 2 and the speaker 1 may be connected to each other through an audio cable or the like in a wired manner.

As shown in FIG. 2, the distribution device 2 is provided with a display 21, a user interface (I/F) 22, a controller 23, a flash memory 24, a RAM 25, a wireless communicator 26, an HDMI (registered trademark) interface (I/F) 27, and an audio interface (I/F) 28.

The display 21 is constituted by an LCD, for example. The display 21 displays information related to content data being reproduced, for example.

The user I/F 22 is constituted by a reproduction/stop button, a music selection button, and the like.

The controller 23 is constituted by a CPU or the like. The controller 23 reads out a program stored in the flash memory 24, which serves as a storage medium, to the RAM 25 to achieve various kinds of functions. For instance, the controller 23 may download the program from other devices, such as a server (not shown), as necessary, and read out it to the RAM 25.

The controller 23 performs the acoustic characteristics measuring process to measure acoustic characteristics of the speaker 1 and an installed environment thereof. The controller 23 reads out a program related to the acoustic characteristics measuring process, which is stored in the flash memory 24, to the RAM 25.

The flash memory 24 stores a correction parameter for performing signal processing related to correction of the acoustic characteristics. The correction parameter is used in the signal processing such as an equalizer (EQ), a compressor (Comp), a delay (Delay), or a gain (Gain), for example.

The wireless communicator 26 is a wireless communicator in compliance with the standard of Wi-Fi (registered trademark), Bluetooth (registered trademark), or the like, for example. The wireless communicator 26 communicates with the speaker 1 through wireless communications such as Wi-Fi (registered trademark) or Bluetooth (registered trademark).

The HDMI (registered trademark) I/F 27 communicates with a television (not shown) or a personal computer (not shown), for example.

The audio I/F 28 is connected to the microphone 30 through a wire, for example. The microphone 30 is installed at a listening position of the user U1, and captures a test sound emitted from the speaker 1.

Here, the acoustic characteristics measuring process for measuring acoustic characteristics of the speaker 1 and an installed environment thereof in the reproduction system 100 will be described with reference to FIG. 3. It is assumed that the microphone 30 is previously installed at the listening position by a user, as shown in FIG. 1.

To emit a test sound such as white noise, the distribution device 2 transmits a test-sound emission instruction to the speaker 1 (S11). When receiving the test-sound emission instruction, the speaker 1 emits the test sound. The distribution device 2 obtains the test sound, which is captured by the microphone 30, through the audio I/F 28 (S12). The distribution device 2 measures acoustic characteristics (transfer function) based on the obtained test sound (S13). The distribution device 2 calculates a correction parameter based on the measured acoustic characteristics (S14).

The correction parameter is a parameter for a listener to hear a sound with ideal acoustic characteristics (frequency characteristics, arrival timing, arrival volume, or the like), for example. The ideal acoustic characteristics are specified by a manufacturer of the speaker 1 in advance. The distribution device 2 calculates a correction parameter based on the measured acoustic characteristics and the ideal acoustic characteristics.

The distribution device 2 transmits the calculated correction parameter to the speaker 1.

As shown in FIG. 4, the speaker 1 is provided with a display 11, a user interface (I/F) 12, a controller 13, a flash memory 14, a RAM 15, a wireless communicator 16, a signal processor 17, a sound emitter 18, and an acceleration sensor 19.

The display 11 is constituted by a plurality of LEDs. The display 11 displays a standby state/power-on state, for example. Further, the display 11 displays a state of updating a correction parameter, a state of performing acoustic correction processing, or the like, for example.

The user I/F 12 is constituted by a power button, for example.

The controller 13 is constituted by a CPU or the like. The controller 13 reads out a program stored in the flash memory 14, which serves as a storage medium, to the RAM 15 to achieve various kinds of functions.

When receiving a test-sound emission instruction, which instructs emission of a test sound, from the distribution device 2, the controller 13 emits the test sound from the sound emitter 18, for example. Further, the controller 13 obtains a correction parameter from the distribution device 2 through the wireless communicator 16. The controller 13 stores the obtained correction parameter in the flash memory 14 or the RAM 15. Using the obtained correction parameter, the controller 13 causes the signal processor 17 to perform signal processing related to the acoustic correction.

The controller 13 updates the correction parameter at a predetermined timing. When receiving the test-sound emission instruction from the distribution device 2, the controller 13 performs the acoustic characteristics measuring process shown in FIG. 3 again, for example. The controller 13 receives the calculated correction parameter, which is obtained in S14, from the distribution device 2, and then updates the correction parameter stored in the flash memory 14 or the RAM 15 to a new correction parameter, which is received mentioned above. In the first embodiment, the operation of measuring acoustic characteristics is also an example of the correction parameter update process.

The wireless communicator 16 is a wireless communicator in compliance with the standard of Wi-Fi (registered trademark), Bluetooth (registered trademark), or the like, for example. The wireless communicator 16 communicates with the distribution device 2 through wireless communications such as Wi-Fi (registered trademark) or Bluetooth (registered trademark). The wireless communicator 16 is an example of a sound-signal interface in the present disclosure.

The signal processor 17 is constituted by at least one DSP. Using the correction parameter, the signal processor 17 applies signal processing to the sound signal according to control of the controller 13.

The sound emitter 18 has a DA converter, an amplifier, and a speaker unit. The sound emitter 18 reproduces the sound signal, which is subjected to the signal processing in the signal processor 17, and emits a sound. Further, in the acoustic characteristics measuring process performed by the distribution device 2, the sound emitter 18 emits a test sound.

Now, the speaker 1 may be moved by a user. As shown in FIG. 5, the speaker 1 is moved to a position P2 from a position P1 (hereinafter, referred to as "the movement" or "movement of the speaker 1"). In this case, the controller 13 detects movement of the speaker 1 from a detection signal obtained from the acceleration sensor 19. Further, the controller 13 also detects that the movement is stopped after the speaker 1 is moved from a detection signal obtained from the acceleration sensor 19. To detect the movement stop means that the acceleration sensor 19 detects no acceleration continuously for a predetermined time (e.g., for 1 second) after detecting the movement of the speaker 1, or example.

If the correction parameter update process is performed during the movement of the speaker 1, it will be difficult to obtain correct acoustic characteristics, so that appropriate acoustic correction cannot be performed. In order to prevent this, when detecting the movement of the speaker 1 from a detection signal obtained from the acceleration sensor 19, the controller 13 performs an update-process stopping process, i.e., stops the correction parameter update process such that the correction parameter update process does not operate during the movement of speaker 1.

The update-process stopping process will be described with reference to FIG. 6. When detecting the movement of the speaker 1 from a detection signal obtained from the acceleration sensor 19 (S21:Yes), the controller 13 determines whether the correction parameter update process is being performed or not (S22). If the correction parameter update process is being performed (S22:Yes), the controller 13 will stop the correction parameter update process (S23). When detecting that the movement is stopped from a detection signal obtained from the acceleration sensor 19 (S24: Yes), the controller 13 completes the process.

Further, if not detecting that the movement is stopped from a detection signal obtained from the acceleration sensor 19 (S24:No), the controller 13 returns the process to S22.

In this way, when detecting the movement of the speaker 1, if the correction parameter update processing is in operation, the speaker 1 will stop the correction parameter update process. Thus, the speaker 1 of the first embodiment can perform appropriate acoustic correction.

Note that, the controller 13 may perform the correction parameter update process periodically. In this case, the controller 13 performs the correction parameter update process at predetermined time intervals, for example, for every 30 minutes. Alternatively, the speaker 1 may perform the correction parameter update process at the timing when detecting that the movement is sopped after the speaker 1 is moved. By performing the correction parameter update process periodically, the speaker 1 can perform appropriate acoustic correction periodically, even if being moved.

Note that, the microphone 30 may be attached to a mobile terminal such as a smart phone, for example. In this case, the distribution device 2 obtains a sound signal from the microphone through the wireless communicator 26.

[First Modification]

Now, it is assumed that the speaker 1 detects that the movement is stopped after the speaker 1 is moved. In a first modification, the speaker 1 updates a correction parameter using the acceleration sensor 19 without remeasuring acoustic characteristics of an installed environment of the speaker 1 after the movement. In the first modification, the acceleration sensor 19 is a three-axis acceleration sensor. Note that, like reference signs indicate like configurations in the first embodiment mentioned above, and detailed description thereof is omitted.

In the first modification, to calculate a correction parameter using the acceleration sensor 19, the speaker 1 memorizes a relative position between a position (initial position (position P1)) of the speaker 1 before the movement and a listening position. In other words, by comparing a relative position between a position P1 of the speaker 1 before the movement and a listening position with a relative position between a position P2 of the speaker 1 after the movement and the listening position, the speaker 1 calculates a correction parameter.

The relative position between the position P1 and the listening position is calculated by the following calculation means, for example. The microphone 30 captures a test sound, which is emitted from the speaker 1, at three places close to the listening position, for example. The distribution device 2 calculates the relative position between the position P1 and the listening position based on the test sound captured at each of the three places. In more detail, the distribution device 2 calculates a time difference between an emitting timing and a capturing timing of the test sound at each of the three places. The distribution device 2 calculates a distance between the speaker 1 and the microphone based on the time difference obtained above. The distribution device 2 calculates the distances between the speaker 1 and the microphone at the three places. Further, using the calculated distances, the distribution device 2 calculates a relative position between the speaker 1 (position P1) and the listening position according to the principle of trigonometric functions (triangulation).

Note that, a user may move a single microphone 30 to the three places to capture the test sound, or may use three microphones 30 to capture the test sound simultaneously. Further, among the three places close to the listening position, one place may be the listening position. Note that, the distribution device 2 may consider any one of the three places as the listening position, or may consider a center of gravity position of the three places as the listening position, for example. Herein, the three places each are a place at which the test sound is measured.

The distribution device 2 transmits position information to the speaker 1. The position information is information related to the relative position between the position P1 and the listening position.

The speaker 1 receives the position information, which is related to the relative position, and stores it in a storage.

When detecting that the movement is stopped after the speaker 1 is moved, the controller 13 detects a moving distance D1 and a moving angle A1 based on a detection signal obtained from the acceleration sensor 19 (see FIG. 5). More specifically, the moving distance D1 is a distance by which the speaker 1 is moved from the position P1 to the position P2, as shown in FIG. 5. The detected acceleration is integrated twice to obtain the moving distance D1, for example. The moving angle A1 is an angle formed by the listening position and the position P2. Herein, it is assumed that a vertical direction in the paper is defined as a longitudinal direction y1 and a horizontal direction in the paper is defined as a transverse direction x1. The moving angle A1 is an angle formed by a straight line indicating the moving distance D1 and the transverse direction x1. To obtain the moving angle A1, an acceleration in the transverse direction x1 and an acceleration in the longitudinal direction y1 are used among the accelerations measured by the three-axis acceleration sensor.

Figure 7:
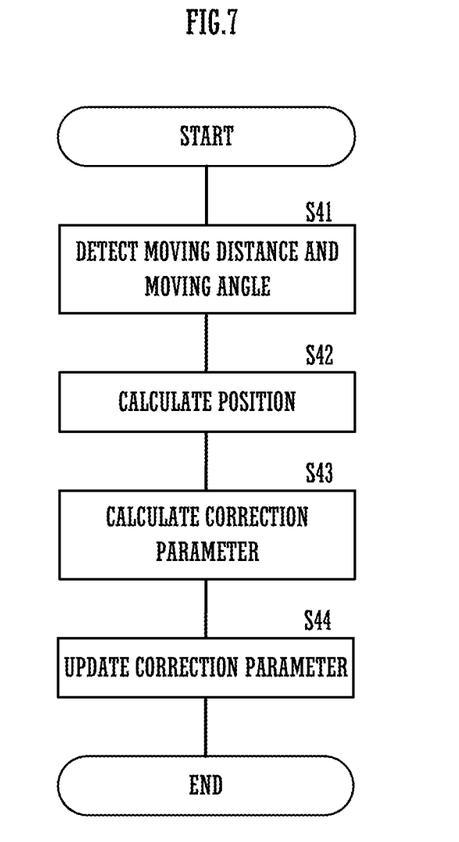
FIG. 7 is a flowchart exemplarily showing a correction parameter update process in a first modification.

A correction parameter update process of the first modification will be described with reference to FIG. 7. When detecting that the movement is stopped, the controller 13 detects a moving distance D1 and a moving angle A1 based on a detection signal obtained from the acceleration sensor 19 (S41). Using the detected moving distance D1 and moving angle A1, and the previously stored position information (information on the relative position between the position P1 and the listening position) before the movement, the controller 13 calculates a relative position between a position (position P2) of the speaker 1 and the listening position (S42). Further, based on position information on the calculated relative position (information on a relative position between the position P2 and the listening position) and the previously stored position information (information on the relative position between the position P1 and the listening position) before the movement, the controller 13 calculates a correction parameter (S43). After that, the controller 13 updates the correction parameter stored before the movement to the calculated correction parameter (S44).

For instance, when a distance between the position P2 and the listening position becomes larger than a distance between the position P1 and the listening position, the controller 13 changes content of the correction parameter before the movement, i.e., increases a delay and decreases a gain. Further, when a distance between the position P2 and the listening position becomes larger than a distance between the position P1 and the listening position, the controller 13 changes content of an EQ, a compressor, or the like.

The controller 13 performs acoustic correction processing using the calculated correction parameter.

In this way, when detecting that the movement is stopped after the speaker 1 is moved, the speaker 1 of the first modification calculates a correction parameter using the acceleration sensor 19. Thus, the first modification can perform appropriate acoustic correction in a short time, even if the speaker 1 is moved.

Further, the speaker 1 may be provided with a GPS sensor, for example. The speaker 1 may obtain the position information through the GPS sensor. The speaker 1 may obtain a position of an information processing terminal such as a smart phone, and set the position of the terminal as the listening position. Further, the speaker 1 can also obtain the relative position between the speaker 1 and the listening position by transmitting and receiving a measurement signal to and from a beacon of Bluetooth (registered trademark) or an access point of Wi-Fi (registered trademark).

[Second Modification]

The speaker 1 of a second modification remeasures acoustic characteristics, when a moving distance indicating magnitude of the movement exceeds a predetermined threshold. Further, when the moving distance is less than or equal to the threshold, the speaker 1 of the second modification updates a correction parameter using the acceleration sensor 19. In the second modification, the case where a threshold of the moving distance is set to 50 cm will be described as an example. Note that, like reference signs indicate like configurations in the first embodiment mentioned above, and detailed description thereof is omitted.

When the moving distance exceeds a threshold, the speaker 1 transmits a notification signal to the distribution device 2, for example. Herein, the notification signal notifies that the moving distance has exceeded the threshold. The distribution device 2 receives the notification signal that is transmitted from the speaker 1. When receiving the notification signal, the distribution device 2 transmit a test-sound emission instruction to the speaker 1. The test-sound emission instruction instructs the speaker 1 to emit a test sound. When receiving the test-sound emission instruction, the speaker 1 emits the test sound. The distribution device 2 obtains the test sound captured by the microphone 30. The distribution device 2 measures acoustic characteristics based on the obtained test signal. The distribution device 2 calculates a correction parameter based on the measured acoustic characteristics. The speaker 1 receives the correction parameter from the distribution device 2 through the wireless communicator 16.

Further, when the moving distance is less than or equal to the threshold, the controller 13 updates the current correction parameter to a new correction parameter. The new correction parameter is a correction parameter that is calculated based on the detection signal obtained from the acceleration sensor 19 (the calculation technique of the correction parameter using a detection signal obtained from the acceleration sensor 19 is shown in the first modification and FIG. 7).

In this way, when the moving distance is less than a predetermined threshold, the speaker 1 of the second modification can update a correction parameter in a short time using a detection signal obtained from the acceleration sensor 19. Further, when the moving distance exceeds the predetermined threshold, the speaker 1 remeasures acoustic characteristics, thereby making it possible to update a correction parameter more accurately.

[Third Modification]

The speaker 1 of a third modification performs different correction-parameter update processes depending on magnitude of the movement. Note that, like reference signs indicate like configurations in the first embodiment mentioned above, and detailed description thereof is omitted.

For instance, the speaker 1 may incline or move slightly (e.g., a displacement of more than or equal to 0 cm and less than 4 cm), if an impact is applied thereto. From a detection signal obtained from the acceleration sensor 19, when determining that the movement is slight, the controller 13 does not update a correction parameter.

Further, when the moving distance is middle (e.g., more than or equal to 4 cm and less than 50 cm), the controller 13 detects a moving distance and a moving angle from a detection signal obtained from the acceleration sensor 19. The controller 13 calculates a correction parameter based on the detected moving distance and moving angle (see the first modification and FIG. 7).

Further, when the moving distance is long (e.g., more than or equal to 50 cm), the controller 13 measures acoustic characteristics of an installed environment of the speaker 1 after the movement (see the second modification).

Thus, the speaker 1 of the third modification changes content of the process depending on magnitude of the movement of the speaker 1, thereby making it possible to update a correction parameter efficiently. Further, if the movement of the speaker 1 is slight, the speaker 1 of the third modification will not update a correction parameter, thereby making it possible to reduce a load of the process.

[Fourth Modification]

Figure 8:
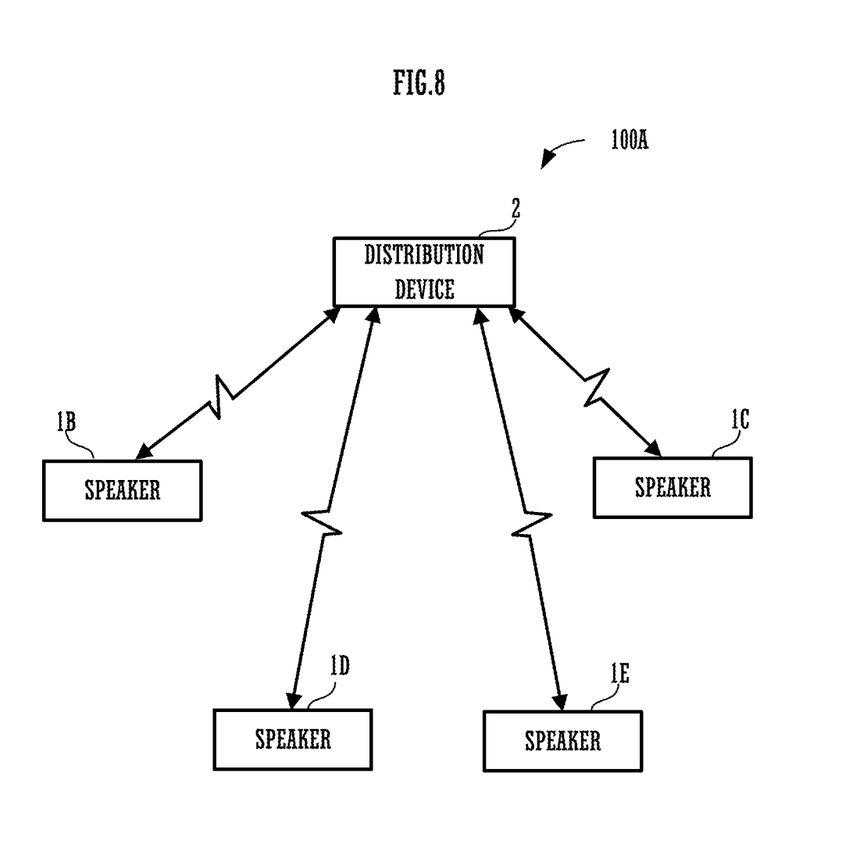
FIG. 8 is a diagram showing an initial position of each speaker in a reproduction system of a fourth modification.
Figure 9:
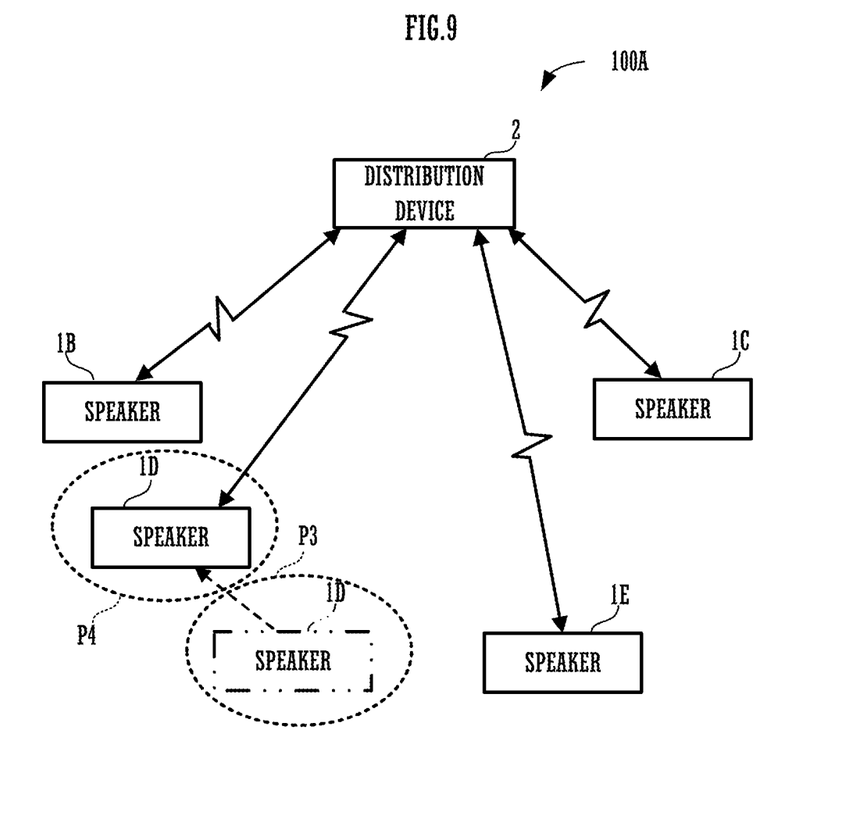
FIG. 9 is a diagram showing a configuration of the reproduction system of the fourth modification after one speaker is moved.
Figure 10:
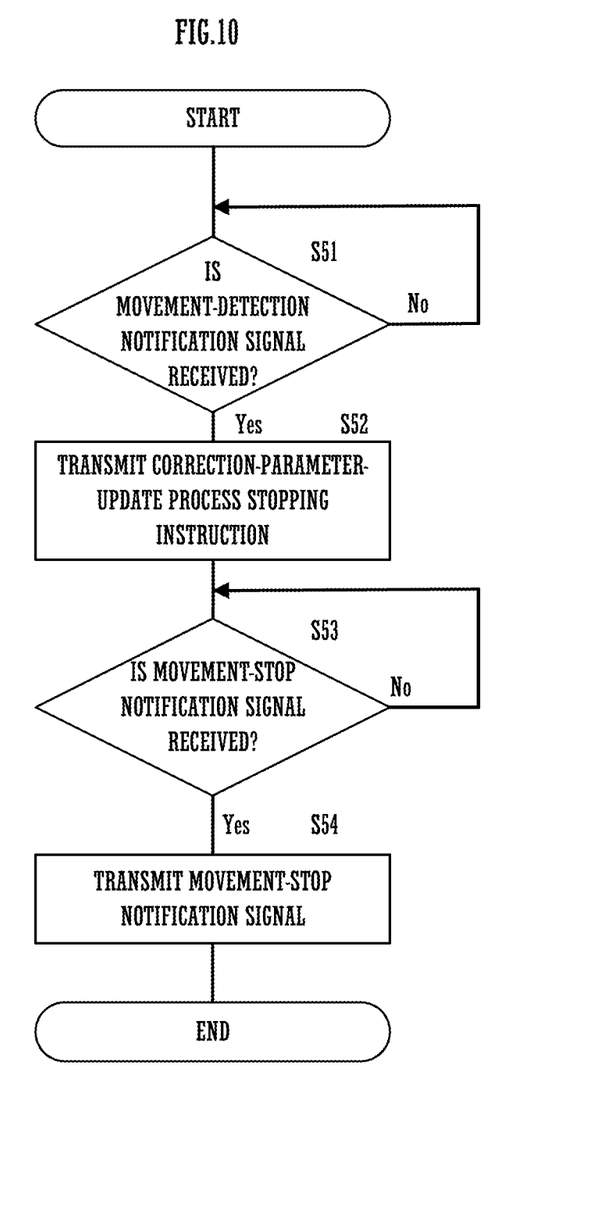
FIG. 10 is a flowchart showing an operation of the distribution device of the fourth modification.
Figure 11:
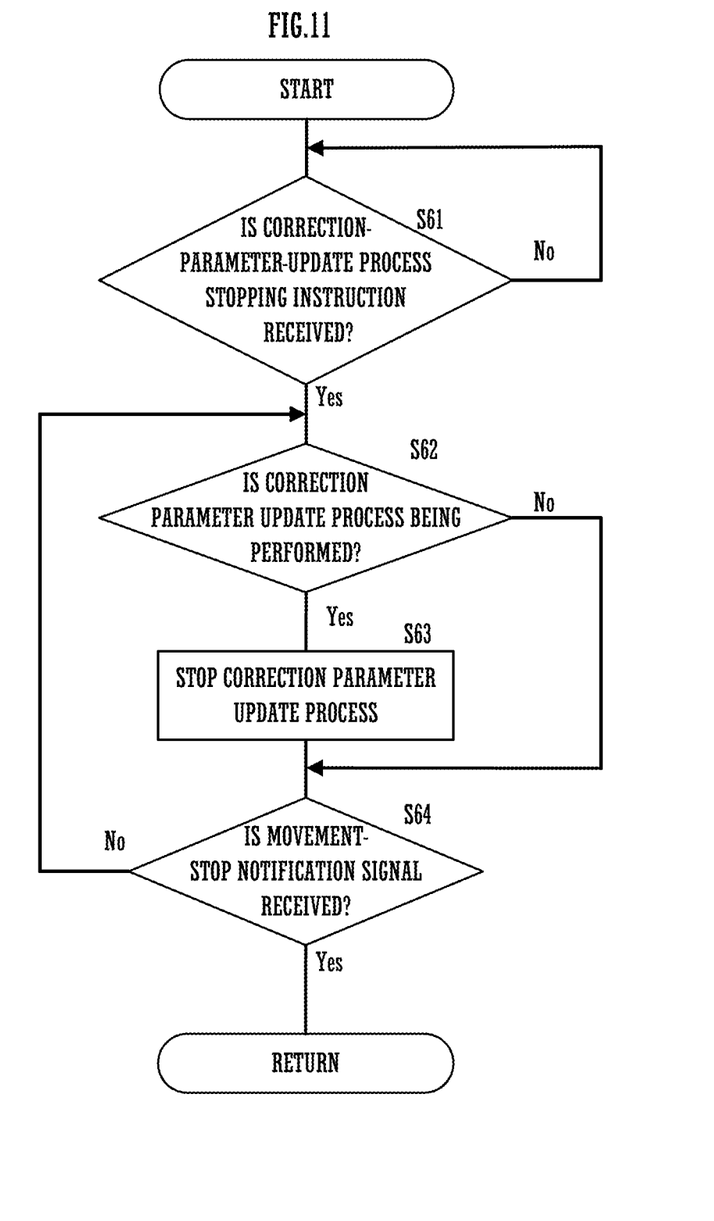
FIG. 11 is a flowchart showing an operation of the speaker of the fourth modification.

A reproduction system 100A of a fourth modification is provided with a plurality of speakers 1B, 1C, 1D, and 1E. The reproduction system 100A will be described with reference to FIGS. 8, 9, 10, and 11. FIG. 8 is a diagram showing initial positions of speakers 1B, 1C, 1D, and 1E in the reproduction system 100A of the fourth modification. FIG. 9 is a diagram showing a configuration after one speaker (speaker 1D) is moved in the reproduction system 100A of the fourth modification. FIG. 10 is a flowchart showing an operation of the distribution device 2 of the fourth modification. FIG. 11 is a flowchart showing an operation of the speakers 1B, 1C, and 1E of the fourth modification. Note that, like reference signs indicate like configurations in the first embodiment mentioned above, and detailed description thereof is omitted. In this example, each of the plurality of speakers 1B, 1C, 1D, and 1E has the same configuration as that of the speaker 1 of the first embodiment.

The plurality of speakers 1B, 1C, 1D, and 1E are connected to the distribution device 2 wirelessly, as shown in FIG. 8.

The distribution device 2 assigns a reproduction role (channel) to each of the plurality of speakers 1B, 1C, 1D, and 1E, and transmits a sound signal corresponding to the channel assigned to each of the plurality of speakers 1B, 1C, 1D, and 1E. In more detail, the distribution device 2 decodes content data received from the server to extract sound signals corresponding to a plurality of channels, for example. However, the distribution device 2 may receive decoded sound signals corresponding to the plurality of channels. The distribution device 2 distributes the decoded sound signals, which correspond to the plurality of channels, to the plurality of speakers 1B, 1C, 1D, and 1E.

The controller 23 calculates a relative position between an installed position, at which each of the plurality of speakers 1B, 1C, 1D, and 1E is installed, and the listening position. The calculation method of a relative position between a position of each of the plurality of speakers 1B, 1C, 1D, and 1E, which is placed before having been moved, and the listening position is the same as the calculation means of the relative position between the speaker 1 and the listening position described in the first modification. Therefore, the description thereof is omitted here.

For instance, the distribution device 2 distributes a sound signal corresponding to an L channel to the speaker 1B. The distribution device 2 distributes a sound signal corresponding to an R channel to the speaker 1C, for example. Further, the distribution device 2 distributes a sound signal corresponding to an SL (surround L) channel to the speaker 1D. The distribution device 2 distributes a sound signal corresponding to an SR (surround R) channel to the speaker 1E. Each of the speakers 1B, 1C, 1D, and 1E uses the sound emitter 18 to reproduce the sound signal that is received as a sound signal corresponding to each channel. By doing so, surround reproduction is achieved in the reproduction system 100A.

Now, the case where any one of the plurality of speakers 1B, 1C, 1D, and 1E is moved will be described as an example. In this example, the case where the speaker 1D is moved to the position P4 from the position P3 will be described with reference to FIG. 9.

For instance, as shown in FIG. 9, it is assumed that a user moves the speaker 1D from the position P3 to the position P4 (hereinafter, referred to as "the movement" or "movement of the speaker 1D"). In this case, the speaker 1D detects movement of the speaker 1D based on a detection signal obtained from the acceleration sensor 19. If a correction parameter update process is performed during the above-mentioned detection, the speaker 1D will stop the correction parameter update process.

Operations of the distribution device 2 and the speakers 1B, 1C, and 1E will be described with reference to FIGS. 10 and 11.

The speaker 1D transmits a movement-detection notification signal to the distribution device 2. The movement-detection notification signal notifies that the movement of the speaker 1D is detected. When receiving the movement-detection notification signal from the speaker 1D (S51:Yes), the distribution device 2 transmits a correction-parameter-update process stopping instruction to the speakers 1B, 1C, and 1E (S52). The correction-parameter-update process stopping instruction instructs the speakers 1B, 1C, and 1E to stop a correction parameter update process.

When receiving the correction-parameter-update process stopping instruction (S61:Yes), if a correction parameter update process is being performed (S62:Yes), the speakers 1B, 1C, and 1E will stop the correction parameter update process (S63).

When detecting that the movement of the speaker 1D is stopped, the speaker 1D transmits a movement-stop notification signal to the distribution device 2. Further, when receiving the movement-stop notification signal (S53:Yes), the distribution device 2 transmits a signal to the speakers 1B, 1C, and 1E to notify that the movement of the speaker 1D is stopped (S54).

Until receiving the signal notifying that the movement of the speaker 1D is stopped, the speakers 1B, 1C, and 1E repeat processes of S62 and S63 (S64).

In this way, if at least one of the speakers 1B, 1C, 1D, and 1E is moved, the reproduction system 100A of the fourth modification will stop a correction parameter update process of the speakers 1B, 1C, 1D, and 1E. Therefore, the reproduction system 100A of the fourth modification can perform appropriate acoustic correction even if any one of the speakers 1B, 1C, 1D, and 1E is moved.

[Fifth Modification]

When one speaker of the plurality of speakers 1B, 1C, 1D, and 1E is moved and then the movement of one speaker is stopped, the distribution device 2 of a fifth modification reassigns channels. Note that, like reference signs indicate like configurations in the fourth modification mentioned above, and detailed description thereof is omitted.

Figure 12:
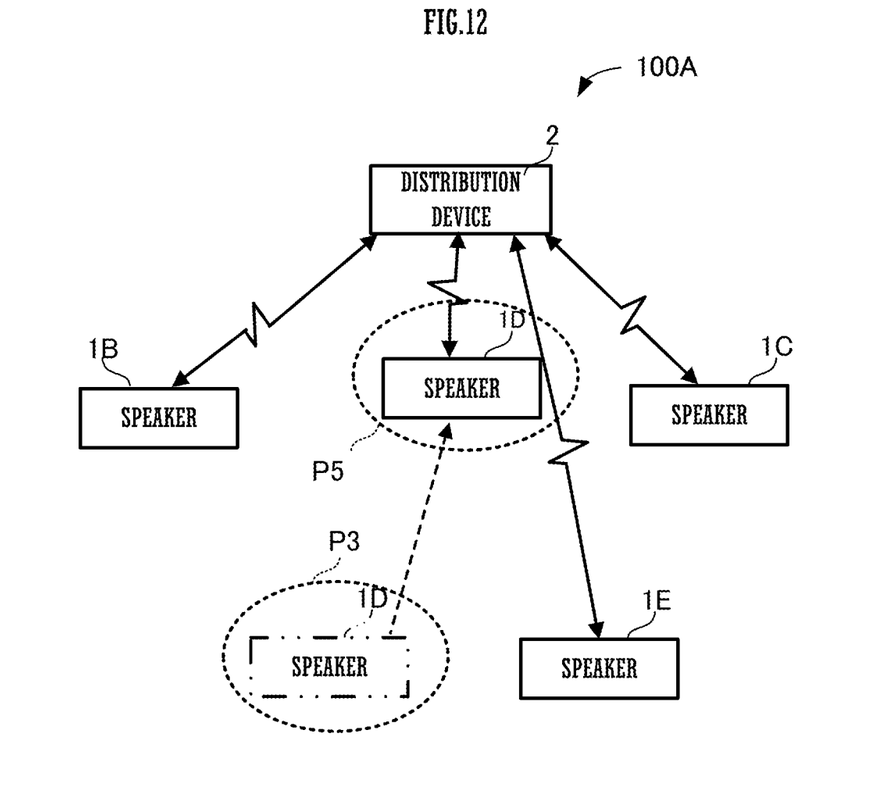
FIG. 12 is a diagram showing a configuration of a reproduction system of a fifth modification, when the speaker is moved a short distance.

An operation of the distribution device 2 of the fifth modification will be described with reference to FIG. 12. FIG. 12 is a diagram showing a configuration after one speaker is moved in the reproduction system 100A of the fifth modification.

For instance, as shown in FIG. 12, it is assumed that a user moves the speaker 1D from the position P3 to the position P5 (hereinafter, referred to as "the movement" or "movement of the speaker 1D"). In the fifth modification, the speaker 1D is moved a relatively large distance. In this case, channels are reassigned to the plurality of speakers 1B, 1C, 1D, and 1E. The reassignment of channels is also an example of the correction parameter update process. The distribution device 2 transmits a correction parameter to the plurality of speakers 1B, 1C, 1D, and 1E.

When receiving the correction parameter from the distribution device 2, the speakers 1B, 1C, 1D, and 1E each store the correction parameter in a storage.

Now, it is assumed that the speaker 1D detects that the movement is stopped after the speaker 1D is moved. For instance, if being moved such that a moving distance indicating magnitude of the movement exceed a threshold, the speaker 1D will transmit a notification signal to the distribution device 2 to notify that the speaker 1D is moved such that the moving distance exceeds the threshold. In the fifth modification, the case where a threshold of the moving distance is set to 100 cm will be described as an example.

The speaker 1D calculates a relative position between an installed position of the speaker 1D and a listening position. The distribution device 2 receives information on the relative position between the installed position of the speaker 1D and the listening position, and reassigns channels to the plurality of speakers 1B, 1C, 1D, and 1E according to the above-mentioned information.

For instance, it is assumed that the distribution device 2 determines that the speaker 1D is moved to the front of the listening position, as shown in FIG. 12. In this case, the distribution device 2 assigns a center channel to the speaker 1D. However, only by changing the channel assigned to the speaker 1D, it is not enough to prevent a speaker reproducing a sound signal corresponding to the SL channel, which is assigned to the speaker 1D, from being eliminated. Therefore, the distribution device 2 causes the speaker 1B to reproduce sound signals corresponding to the L channel and the SL channel, for example. Herein, the speaker 1B is a speaker located on a left-hand side of the listening position. More specifically, the distribution device 2 distributes sound signals corresponding to the L channel and the SL channel to the speaker 1B. Alternatively, the distribution device 2 may distribute sound signals corresponding to the SL channel and the SR channel to the speaker 1E. The speaker 1E is a speaker located on a rear side of the listening position.

Further, the distribution device 2 distributes a sound signal corresponding to the R channel to the speaker 1C. Further, the distribution device 2 distributes a sound signal corresponding to the SR channel to the speaker 1E.

In this way, in the fifth modification, if at least one of the speakers 1B, 1C, 1D, and 1E is moved and magnitude of the movement exceeds a threshold, the distribution device 2 will reassign channels. Therefore, the reproduction system 100A of the fifth modification can perform appropriated acoustic correction, even if at least one of a plurality of speakers is moved.

[Sixth Modification]

In a reproduction system 100A of a sixth modification, for example, when the speaker 1D is moved to another room from a room (space) where the speaker 1D has been installed before being moved, the distribution device 2 maintains surround reproduction using the speakers 1B, 1C, and 1E.

For instance, if a level of the test sound emitted from the speaker 1D is less than or equal to a predetermined level, the distribution device 2 will determine that the speaker 1D is moved to another room (a place where a sound emitted from the speaker 1D does not reach the listening position). Alternatively, a user may input distance information related to a size of the room previously. In this case, when a moving distance of each speaker exceeds the previously inputted distance information, the distribution device 2 determines that the speaker is moved to another room.

When determining that the speaker 1D is moved to another room, the distribution device 2 causes the speakers 1B, 1C, and 1E to stop a correction parameter update process (see the fourth modification).

When determining that the speaker 1D is moved to another room, the distribution device 2 removes the speaker 1D from a group of surround reproduction. However, only by removing the speaker 1D from the group of surround reproduction in the reproduction system 100A of the sixth modification, it is not enough to prevent a speaker reproducing a sound signal corresponding to the SL channel, which is assigned to the speaker 1D, from being eliminated.

Therefore, the distribution device 2 reassigns channels to the plurality of speakers 1B, 1C, and 1E as described in FIG. 12, for example. More specifically, the distribution device 2 distributes sound signals corresponding to the L channel and the SL channel to the speaker 1B. Alternatively, the distribution device 2 may distribute sound signals corresponding to the SL channel and the SR channel to the speaker 1E.

Thus, even if any one of the speakers is moved to another room, so that no speaker is disposed in the same space, the reproduction system 100A maintains surround reproduction using the remaining speakers. Therefore, the reproduction system 100A of the sixth modification can perform appropriate acoustic correction, even if any one of the speakers is moved a large distance.

Note that, after removing the speaker 1D from a group of surround reproduction and reassigning channels, the distribution device 2 may amplify a sound volume of the content emitted from the speakers 1B, 1C, and 1E. Thus, even if the number of speakers is reduced, the distribution device 2 can maintain a feeling of sound volume of the entire surround reproduction.

Lastly, the description of the present embodiments is illustrative in all respects and is not to be construed restrictively. The scope of the present invention is indicated by the appended claims rather than by the above-mentioned embodiments. Furthermore, the scope of the present invention is intended to include the scope of the claims and equivalent scope of the claims.

What is claimed is:

1. A reproduction device comprising:
   a sound-signal interface that inputs a sound signal;
   a signal processor that applies acoustic correction to the sound signal using a predetermined correction parameter;
   a sound emitter that emits sound based on the sound signal subjected to the acoustic correction;
   an acceleration sensor; and
   a controller configured to:
      update the predetermined correction parameter;
      detect movement of the reproduction device based on the acceleration sensor; and
      stop the updating of the predetermined correction parameter currently being updated upon the controller detecting movement of the reproduction device.

2. The reproduction device according to claim 1, wherein the controller updates the predetermined correction parameter upon the controller detecting no movement of the reproduction device after detecting the movement of the reproduction device.

3. The reproduction device according to claim 2, wherein, in a state where a magnitude of movement of the reproduction device exceeds a predetermined threshold and thereafter the controller detects no movement of the reproduction device, the controller is configured to:
   measure acoustic characteristics of an installed environment of the reproduction device; and
   calculate the predetermined correction parameter according to the measured acoustic characteristics.

4. The reproduction device according to claim 1, wherein the controller updates the predetermined correction parameter to a different parameter according to a magnitude of movement of the reproduction device.

5. The reproduction device according to claim 1, wherein the controller determines whether or not to update the predetermined correction parameter according to a magnitude of movement of the reproduction device.

6. The reproduction device according to claim 1, wherein the controller calculates at least one of a moving distance or a moving angle of the reproduction device based on the acceleration sensor.

7. The reproduction device according to claim 1, wherein the controller updates the predetermined correction parameter at a predetermined time interval.

8. A reproduction system comprising:
   a distribution device; and
   a plurality of reproduction devices each comprising:
      a sound-signal interface that inputs a sound signal;
      a signal processor that applies acoustic correction to the sound signal using a predetermined correction parameter;
      a sound emitter that emits sound based on the sound signal subjected to the acoustic correction;
      an acceleration sensor; and
      a controller configured to:
         update the predetermined correction parameter;

detect movement of the reproduction device based on the acceleration sensor; and stop the updating of the predetermined correction parameter currently being updated upon the controller detecting movement of the reproduction device, wherein the distribution device assigns a reproduction role to each of the plurality of reproduction devices, and transmits a sound signal corresponding to the reproduction role to each of the plurality of reproduction devices, and wherein, upon the controller of at least one of the plurality of reproduction devices detecting movement thereof, the controller of each of the plurality of reproduction devices stops the updating of the respective predetermined correction parameter.

9. The reproduction system according to claim 8, wherein, in a state where at least one of the plurality of reproduction devices is moved:

the distribution device changes the reproduction role that is assigned in advance to each of the plurality of reproduction devices, and each of the plurality of reproduction devices applies the acoustic correction based on the changed reproduction role.

10. A reproduction method for a reproduction device including an acceleration sensor, the method comprising:

applying acoustic correction to a sound signal input to the reproduction device using a predetermined correction parameter;

emitting sound based on the sound signal subjected to the acoustic correction;

updating the predetermined correction parameter;

detecting movement of the reproduction device based an acceleration sensor; and stopping the updating of the predetermined correction parameter, in a state where the predetermined correction parameter is currently being updated, upon the detecting detects movement of the reproduction device.

11. The reproduction method according to claim 10, wherein the updating updates the predetermined correction parameter, in a state where the detecting detects no movement of the reproduction device after the detecting detects movement of the reproduction device.

12. The reproduction method according to claim 11, further comprising, in a state where a magnitude of movement of the reproduction device exceeds a predetermined threshold and thereafter the detecting detects no movement of the reproduction device:

measuring acoustic characteristics of an installed environment of the reproduction device; and calculating the predetermined correction parameter according to the measured acoustic characteristics.

13. The reproduction method according to claim 10, wherein the updating updates the predetermined correction parameter to a different parameter according to a magnitude of the movement of the reproduction device.

14. The reproduction method according to claim 10, further comprising determining whether or not to update the predetermined correction parameter according to a magnitude of movement of the reproduction device.

15. The reproduction method according to claim 10, further comprising calculating at least one of a moving distance or a moving angle of the reproduction device based on the acceleration sensor.

16. The reproduction method according to claim 10, wherein the updating updates the predetermined correction parameter at a predetermined time interval.

* * * * *